US009828850B2

(12) United States Patent
Boyanapally et al.

(10) Patent No.: US 9,828,850 B2
(45) Date of Patent: Nov. 28, 2017

(54) HIGH-TO-LOW VOLTAGE COUPLERS AND COUPLING METHODS AND SENSOR-EQUIPPED ELECTRIC SUBMERSIBLE PUMP SYSTEMS

(71) Applicant: Halliburton Energy Services, Inc., Houston, TX (US)

(72) Inventors: Srilatha Boyanapally, Stafford, TX (US); Aram Shihab Khaleel Almuhana, Houston, TX (US); Sudhir Kumar Gupta, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 115 days.

(21) Appl. No.: 14/909,567

(22) PCT Filed: Apr. 28, 2015

(86) PCT No.: PCT/US2015/027918
§ 371 (c)(1),
(2) Date: Feb. 2, 2016

(87) PCT Pub. No.: WO2016/175759
PCT Pub. Date: Nov. 3, 2016

(65) Prior Publication Data
US 2017/0051608 A1 Feb. 23, 2017

(51) Int. Cl.
*G01V 3/00* (2006.01)
*E21B 47/12* (2012.01)
(Continued)

(52) U.S. Cl.
CPC .......... *E21B 47/122* (2013.01); *E21B 17/028* (2013.01); *E21B 43/128* (2013.01); *E21B 47/0007* (2013.01)

(58) Field of Classification Search
None
See application file for complete search history.

(56) References Cited

U.S. PATENT DOCUMENTS 6,587,037 B1 * 7/2003 Besser ................. E21B 43/128
340/538.11
6,798,338 B1 * 9/2004 Layton ................. E21B 43/128
166/302

(Continued)

FOREIGN PATENT DOCUMENTS

GB 2491823 12/2012
WO 2013/132231 9/2013

(Continued)

OTHER PUBLICATIONS

"International Search Report and Written Opinion", dated Jan. 14, 2016, Appl No. PCT/US2015/027918, "High-to-Low Voltage Couplers and Coupling Methods and Sensor-Equipped Electric Submersible Pump Systems," Filed Apr. 28, 2015, 10 pgs.

(Continued)

*Primary Examiner* — Adolf Dsouza
(74) *Attorney, Agent, or Firm* — John Wustenberg; Parker Justiss, P.C.

(57) ABSTRACT

An electrically powered artificial lift system includes a tubular for conveying a wellbore fluid upward and a downhole pump that urges the wellbore fluid into the tubular. A power cable conveys a three-phase power signal to the pump motor on three conductors. One of the three conductors is coupled to an internal node of a high-to-low voltage (HLV) source coupler via a low frequency blocking filter that shields the internal node from the motor power signal while conveying a sensor power signal from the internal node to the selected conductor and conveying a telemetry signal from the selected conductor and to the internal node. A similar downhole coupler couples a wye point of the motor (Continued)

to a downhole sensor assembly to supply the sensor power signal and to receive the telemetry signal.

21 Claims, 3 Drawing Sheets

(51) Int. Cl.
*E21B 43/12* (2006.01)
*E21B 17/02* (2006.01)
*E21B 47/00* (2012.01)

(56) References Cited

U.S. PATENT DOCUMENTS

| | | | |
|---|---|---|---|
| 7,982,633 B2 | 7/2011 | Booker et al. | |
| 8,138,622 B2 | 3/2012 | Layton et al. | |
| 8,334,666 B2* | 12/2012 | Plitt | H02P 3/00 318/255 |
| 9,683,438 B2* | 6/2017 | Fanini | E21B 47/12 |
| 2002/0024783 A1 | 2/2002 | Underwood et al. | |
| 2003/0117025 A1* | 6/2003 | Rouquette | G01V 1/201 307/147 |
| 2006/0257266 A1 | 11/2006 | Ledoux et al. | |
| 2012/0026003 A1 | 2/2012 | Layton | |
| 2013/0312996 A1* | 11/2013 | Nicholson | H02G 9/065 174/50.52 |
| 2014/0118158 A1 | 5/2014 | Parra et al. | |

FOREIGN PATENT DOCUMENTS

| | | |
|---|---|---|
| WO | WO-2013/132232 | 9/2013 |
| WO | WO-2013/132234 | 9/2013 |
| WO | WO-2014/120847 | 8/2014 |
| WO | 2016/175759 | 11/2016 |

OTHER PUBLICATIONS

"NL Search Report", Oct. 21, 2016, Appl No. 1041747, "High-to-Low Voltage Couplers and Coupling Methods and Sensor-Equipped Electric Submersible Pump Systems," Filed Mar. 4, 2016, 9 pgs.

"PCT Application as Filed", Appl No. PCT/US2014/035905, "Ground Fault Immune Power System for Downhole Sensors" filed Apr. 29, 2014, 22 pgs.

"PCT Application as Filed", dated Apr. 28, 2015, Appl No. PCT/US2015/027918, "High-to-Low Voltage Couplers and Coupling Methods and Sensor-Equipped Electric Submersible Pump Systems," filed Apr. 28, 2015, 17 pgs.

"PCT International Search Report and Written Opinion", dated Jan. 16, 2016, Appl No. PCT/US2015/027918, "High-to-Low Voltage Couplers and Coupling Methods and Sensor-Equipped Electric Submersible Pump Systems " filed Apr. 28, 2015, Jan. 14, 2016,10 pgs.

\* cited by examiner

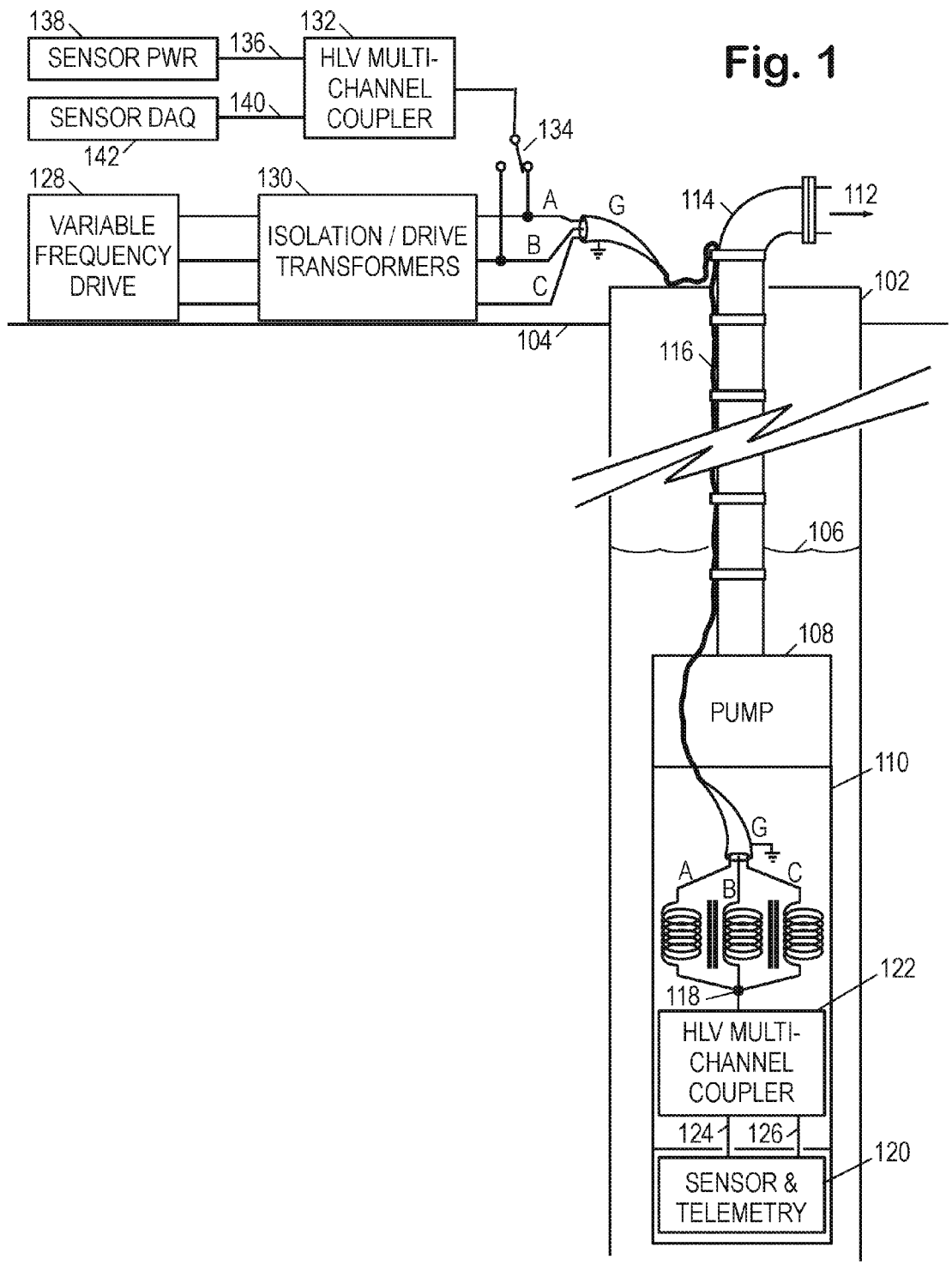

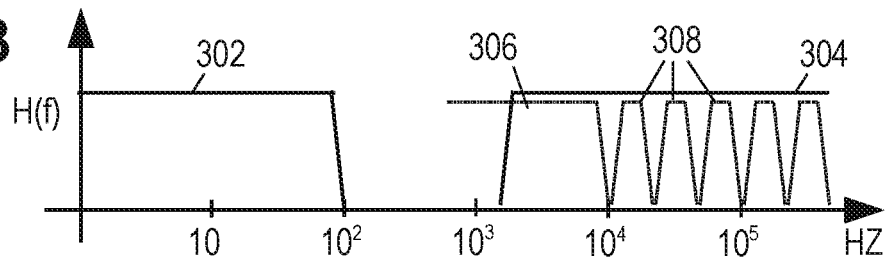
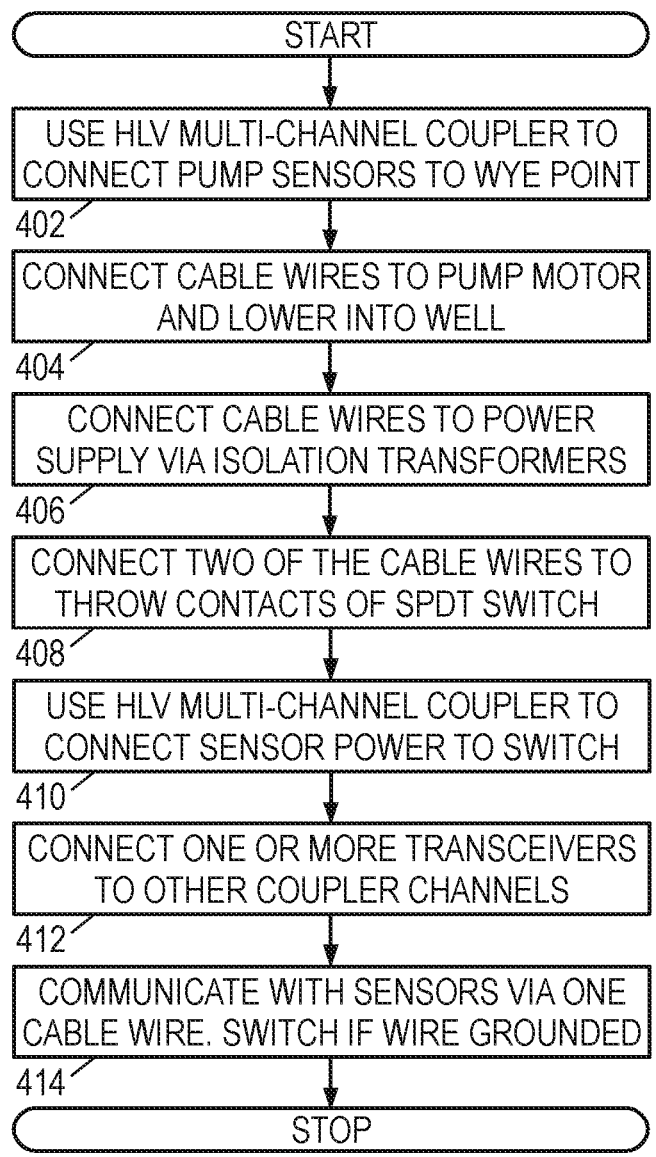

HIGH-TO-LOW VOLTAGE COUPLERS AND COUPLING METHODS AND SENSOR-EQUIPPED ELECTRIC SUBMERSIBLE PUMP SYSTEMS

BACKGROUND

Artificial lift systems, such as Electric Submersible Pump (ESP) systems, are often used in hydrocarbon producing wells to pump fluids from the well up to the surface. The downhole pump motor in an ESP system is typically driven by three-phase power carried from the surface on an armored cable. A number of existing systems further exploit the power-carrying conductors for data communications between downhole sensors and electronic control systems at the surface, enabling the control system to monitor the performance of the pump, to detect faults, and in many cases, to adjust the voltage and frequency of the three-phase power signal as needed to optimize operation of the artificial lift system. Factors for optimization may include safety, production rate, production cost, equipment life, and system reliability.

Each of the techniques employed by existing systems to communicate data on the power-carrying conductors are known to suffer from one or more of the following shortcomings. These shortcomings include: loss of communication when the motor is not running; loss of communication when one of the power-carrying conductors is grounded; inoperability due to drift in electrical component parameters; and requirements for an excessive number of high-voltage circuit components, resulting in reduced reliability. In fact, it is common for a sizeable fraction of ESP systems operating at any given time to be without downhole data communications due to one or more of these shortcomings.

BRIEF DESCRIPTION OF THE DRAWINGS

Accordingly, there are disclosed herein high-to-low voltage (HLV) couplers and coupling methods that may enable significantly enhanced reliability by addressing one or more of the foregoing shortcomings. In the drawings:

FIG. 1 is a schematic diagram of an illustrative electric submersible pump (ESP) system.

FIG. 3 is a graph of an illustrative frequency spectrum arrangement.

FIG. 4 is a flowchart of an illustrative HLV coupling method.

Figure 2A:
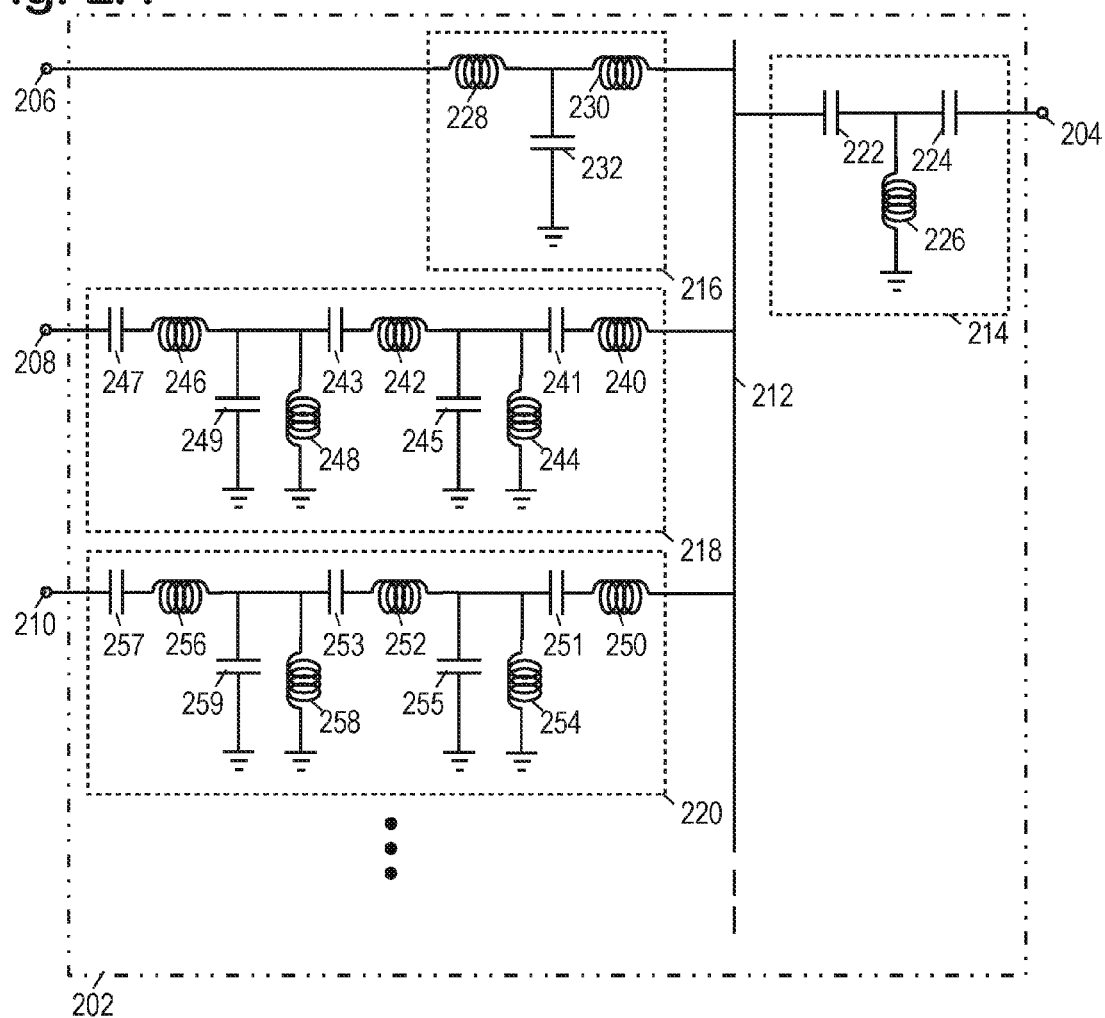
FIG. 2A is a circuit schematic of an illustrative HLV coupler.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DESCRIPTION OF ILLUSTRATIVE EMBODIMENTS

Illustrative embodiments and related methods of the present disclosure are described below as they might be employed in a sensor-equipped electric submersible pump (ESP) system. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, while the development effort might be complex and time-consuming, such decisions would nevertheless be a routine undertaking for those of ordinary skill in the art having the benefit of this disclosure.

Turning now to the figures, FIG. 1 shows an illustrative ESP system for a cased well 102 that extends downwards from the earth's surface 104 into a reservoir, possibly many thousands of feet below the surface. Perforations in the casing enable fluid 106 to flow from the reservoir into the well 102. A pump 108 is submerged in the fluid 106 and driven by an electric motor 110 to urge the fluid 106 to flow as a stream 112 upward along a tubular string 114 to the surface 104. The fluid stream 112 may then be directed to downstream equipment for separation and refining.

An armored cable 116 conveys three-phase, motor power signals from the surface 104 to the electric motor 110. In addition to the armor (G), the cable includes three power-carrying conductors A, B, C, to deliver peak voltages adjustable from zero to several kilovolts, depending on the system design. The motor 110 has three windings, each winding coupled between one of the conductors and a common node termed the wye point 118. Normally, the voltages of the motor power signals cancel out at the wye point 118, leaving it near the ground voltage. However, under certain all-too-common fault conditions, such as when cable 116 gets damaged and one of the power-carrying conductors is shorted to ground, voltage of wye point 118 may be quite substantial.

A sensor assembly 120 is coupled to the wye point 118 via a high-to-low voltage (HLV) multi-channel coupler 122. At times, HLV coupler 122 may be referred to as the sensor coupler 122. As discussed in greater detail below, the sensor coupler 122 shields the sensor assembly 120 from high voltages, conveys a sensor power signal 124 from the wye point 118 to sensor assembly 120, and conveys a telemetry signal 126 from the sensor assembly 120 to the wye point 118. In the sensor assembly, the sensor power signal is rectified and conditioned to supply power to the various sensors and the telemetry transceiver.

At the surface 104, a variable frequency drive 128 supplies the motor power signals via a set of isolation transformers 130 to the power-carrying conductors A, B, C. The isolation transformers 130 enable the pump's three-phase motor to keep running even when one of the power-carrying conductors gets shorted to ground. The isolation transformers 130 may be further configured as step-up transformers, raising the voltage of the motor power signals to reduce transmission losses.

A second HLV multi-channel coupler 132, at times referred to as the source coupler 132, is connected by a switch 134 to a selectable one of the current carrying conductors. As the ESP system becomes inoperable if more than one conductor is grounded, the switch 134 need only connect to two of the three power-carrying conductors and be switched to select whichever one is not grounded. The source coupler 132 couples the selected conductor to a sensor power source 138 and a telemetry receiver 142. As with the sensor coupler 122, the source coupler 132 shields the source 138 and receiver 142 from high voltages, conveys a sensor power signal 136 from the source 138 to the selected conductor, and conveys the telemetry signal from the selected conductor to the receiver 142.

In some embodiments, receiver 142 is integrated into a controller that takes the demodulated data from the receiver and uses it to evaluate the status and performance of the artificial lift system. This evaluation may be reported to a user as part of a visual representation. The controller may further employ the evaluation to modify the three-phase signal being produced by the variable frequency drive 128, e.g., adjusting the voltage and/or frequency to modify the flow rate of the fluid stream 112 in whatever fashion deemed necessary to improve the performance of the system. The controller may be further equipped with a transmitter that sends a downlink signal to the sensor assembly to acquire additional information and modify sensor settings.

The controller's processing circuitry may be in the form of a microprocessor or digital signal processor coupled to non-transitory computer-readable information storage media, e.g., ROM or flash memory. The information storage media stores software for execution by the processing circuitry, which software configures the controller to operate in accordance with the methods disclosed herein. It will be recognized that the same software instructions may also be loaded into the storage from a CD-ROM or other appropriate storage media via wired or wireless methods. Moreover, those ordinarily skilled in the art will appreciate that various aspects of the disclosure may be practiced with a variety of computer-system configurations, including hand-held devices, multiprocessor systems, microprocessor-based or programmable-consumer electronics, minicomputers, mainframe computers, and the like, whether provided in stand-alone form or as part of a computer network that supports distributed computing.

FIG. 2A shows a circuit schematic of the HLV multi-channel couplers 122, 132. HLV coupler 202 includes a high voltage node 204 that connects to the wye point 118 or to a selected one of the power-carrying conductors. The HLV coupler 202 further includes two or more channel nodes 206, 208, 210. A first channel node 206 conveys the sensor power signal, either from the sensor power source 138 or to the power supply of the sensor assembly 120. Additional channel nodes 208, 210 convey signals in discrete frequency bands. Thus, for example, channel node 208 may be connected to the sensor assembly to receive the telemetry signal or to the telemetry receiver to provide the telemetry signal. Channel node 210 may convey a downlink signal downhole. Each node supports bi-directional communication of signals in the associated frequency band.

Each of the external nodes 204-210 is coupled to a shared internal node 212 by a respective filter 214-220. High voltage node 204 is coupled to the internal node 212 by a low frequency blocking filter 214. The illustrated blocking filter 214 includes two capacitors 222, 224 connected in series between the two nodes, with the intermediate node coupled to ground by an inductor 226. Capacitor 224 performs the task of shielding the remaining components of the coupler 202 from the high voltages that may be present on node 204. Accordingly, capacitor 224 may be required to satisfy more stringent specifications than the remaining components, e.g., by being rated for significantly higher voltages. Nevertheless, the coupler 202 is made more reliable by virtue of requiring that no more than one component be exposed to elevated voltages. Indeed, with only one coupler at the surface and one downhole, the reliability of the system as a whole is also improved. With these considerations in mind, we note that alternative low frequency blocking filter designs are available in the literature and may be used as desired.

The first channel node 206 is coupled to the internal node 212 by a low pass filter 216. The illustrated low pass filter 216 includes two inductors 228, 230 connected in series between the two nodes, with the intermediate node coupled to ground by a capacitor 232. Other low pass filter designs are available in the literature and may be used as desired. Moreover, a bandpass filter could alternatively be employed to implement the channel isolation function of this low pass filter.

The additional channel nodes 208, 210 are each coupled to the internal node 212 by respective bandpass filters 218, 220. Illustrated bandpass filter 218 includes five segments, each segment having a capacitor and inductor. Three segments are in series between the internal node and the channel node 208, with the remaining two segments coupling the intermediate nodes to ground. The first segment, which is coupled to internal node 212, is a series combination of an inductor 240 and capacitor 241. The second segment, coupled to the first segment, is a series combination of an inductor 242 and a capacitor 243. The third segment, which couples the node between the first and second segments to ground, is a parallel combination of an inductor 244 and capacitor 245. The fourth segment, which couples the second segment to the channel node, is a series combination of an inductor 246 and capacitor 247. The fifth segment, which couples the node between the first and second segments to ground, is a parallel combination of an inductor 248 and capacitor 249.

Illustrated bandpass filter 220 has a similar arrangement of inductors 250, 252, 254, 256, 258, and capacitors 251, 253, 255, 257, 259, albeit with different component values. Alternative bandpass filter designs are available in the literature and may be used as desired. Among the suitable alternative low frequency blocking filter, low pass filter, and bandpass filter designs are active filter designs, i.e., filter designs relying on operational amplifiers or other powered components. Moreover, the chosen filter designs may employ higher-order designs as desired for minimizing interchannel interference when the overall bandwidth is limited.

The operation of HLV coupler 202 is now described with reference to the illustrative frequency spectrum shown in FIG. 3. The frequency band 302 ranging from 0 to about 100 Hz represents the range of frequencies within which the motor power signal may vary on the high voltage node 204. Frequency band 304, which ranges from about 2 kHz upwards, represents the range of frequencies that are not blocked by low frequency blocking filter 212. That is, signals in these frequency range are conveyed between the high voltage node and the internal node.

Frequency band 306, which ranges from about 10 kHz downwards, represents the range of frequencies that are passed by low pass filter 216. The overlap between frequency bands 304 and 306 represents the first channel of the HLV multi-channel coupler. It is this first channel that is illustratively employed to communicate a sensor power signal downhole. Additional frequency bands 308, each covering about an octave in the range above about 2 kHz, represent the frequency ranges passed by the different bandpass filters 218, 220, each band 308 representing a corresponding channel that may be used for downlink and sensor data signals. The number and size of the various channels are design parameters that are readily customized to the desired purpose.

Importantly, the HLV couplers of the present disclosure avoid the use of resonant ("tuned") filters or isolation blocks. Such tuned filters are susceptible to electrical parameter drift of the circuit components which can cause the center frequency of the filter to become misaligned with the carrier frequency of the signals, rendering the communications link inoperative. Such drift is a common result of age and elevated temperatures like those found in downhole environments.

With the disclosed system design, the channels can be used for communicating power and data across any ungrounded power-carrying conductor in the ESP cable, regardless of whether the pump is running and regardless of whether any of the other power-carrying conductors is grounded. The couplers support bi-directional communication through each channel, enabling upward-going and downward-going signals to share a channel if desired. Alternatively, the system designer may designate separate channels for each signal to simplify transceiver designs. In some contemplated embodiments, each sensor is assigned a respective channel for its telemetry signal. In other contemplated embodiments, multiple sensor data streams are multiplexed into a common telemetry signal which may be transmitted on a selectable one of multiple channels. Such selectability enables alternative channels to be selected if interference is encountered on a given channel. As an alternative embodiment, one bandpass filter may be employed having a adjustable cutoff frequencies that enable the pass band to be shifted to the desired frequency range.

Of particular note is that in the illustrated filter designs, the various filter cutoff frequencies are determined by ratios between the inductive and capacitive values of the circuit elements. The designer remains able to adjust the actual component values to achieve impedance matching with the cable 116. We note that during the design phase, the precise cable impedance may not be known and may be expected to vary from well to well, to vary as the cable ages, and to vary as faults occur in the cable or elsewhere in the system. To account for this, the component values may be chosen to match the lowest expected transmission impedance once all such possibilities (including a ground fault) have been taken into account. Moreover, if there is determined to be a significant frequency dependence to the transmission impedance, the impedance of the low pass filter and bandpass filters may be tailored according to the impedance at the center of their pass bands.

Impedance matching is particularly important for the filters along the path between the sensor power source 138 and the sensor assembly 120 power supply, as inefficient power transfer may require the sensor power source 138 to be sized significantly larger than would otherwise be the case. We note that the impedance of the cable and motor dominate the load impedance being driven by the source coupler. Accordingly, the source coupler's impedance at the high voltage node may be designed to match (i.e., to be equal to) the apparent impedance of the cable and motor thereby minimizing reflections. At the first channel node, the source coupler's impedance may be designed to mirror (i.e., to be the complex conjugate of) the power source impedance, so as to maximize power transfer.

Figure 2B:
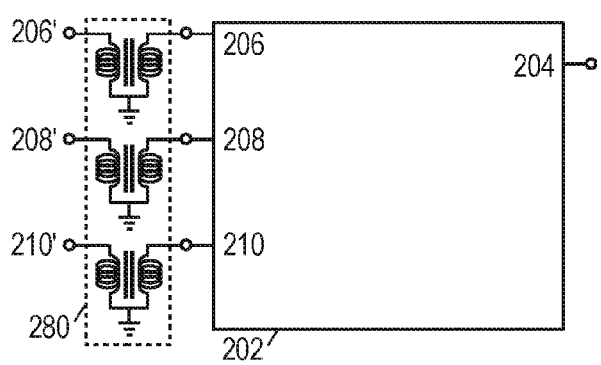
FIG. 2B is an illustrative HLV coupler equipped with impedance-matching transformers.

Downhole, the motor impedance tends to dominate the source impedance driving the downhole coupler. Accordingly, the downhole coupler's high voltage node impedance may be designed to match the sum of the cable and motor impedance, while the impedance on the downhole coupler's first channel node may be minimized. One potential difficulty of this approach is the wide variation in impedance of different motors. This potential difficulty may be addressed by providing different versions of the downhole coupler for use with different motors. An alternative approach is illustrated in FIG. 2B, where a bank of transformers is coupled to the channel nodes to modify the effective impedance on the high voltage node. With n representing the ratio of turns, the transformer steps up the apparent impedance by a factor of $n^2$. Some transformer embodiments may employ switchable windings for modifying the ratio of turns.

FIG. 4 is a flowchart of an illustrative HLV coupling method for achieving enhanced reliability in sensor equipped ESP systems. In block 402, the high voltage node of the HLV sensor coupler is connected to the wye point of the motor, and the channel nodes are connected to the power and data signal nodes of the downhole sensor assembly. In block 404, the power-carrying conductors are connected to the pump motor terminals. One or more of these steps may be performed in the shop as part of the assembly process for the downhole pump. The work crew lowers the pump into the well on the end of a tubular string, securing the power cable with straps as needed.

In block 406, after the pump assembly has been anchored in place and the piping connections completed, the crew connects the other end of the power-carrying conductors to the isolation transformers for the source of three-phase power for the motor. In block 408, the crew connects the throw contacts of a single pole double throw (SPDT) switch to two of the power-carrying conductors, and in block 410, the crew connects the pole contact of the switch to the high voltage node of the HLV source coupler. In block 412, the channel nodes of the HLV source coupler are connected to the sensor power source and to the surface transceiver, completing the communications channels. In block 414, the control system employs the communications channels to provide power to the downhole sensors and to receive the telemetry signal via one of the power-carrying conductors in the cable. If that conductor becomes grounded, e.g. due to cable damage, the switch is toggled to another of the power-carrying conductors to reinstate communication.

Accordingly, among the embodiments disclosed herein are:

A: An electrically powered artificial lift system that comprises: a tubular for conveying a wellbore fluid upward; a downhole pump that urges the wellbore fluid into the tubular, the downhole pump being driven by a three-phase motor; a cable that conveys a motor power signal to the motor on three conductors; and a high-to-low voltage (HLV) source coupler having an internal node coupled to a selected one of the three conductors via a low frequency blocking filter that shields the internal node from the motor power signal while conveying a sensor power signal from the internal node to the selected conductor and conveying a telemetry signal from the selected conductor and to the internal node.

B: A sensing method for use in an ESP system the method comprising: connecting an electric submersible pump (ESP) cable to a power source for the three-phase motor; supplying, via an impedance-matched high-to-low voltage (HLV) source coupler, a sensor power signal to one of three conductors in the ESP cable; conveying, with an HLV sensor coupler, the sensor power signal from a wye point in a motor for the pump to a downhole sensor assembly; providing, with the HLV sensor coupler, a telemetry signal from the downhole sensor assembly to the wye point; and receiving, via the HLV source coupler, the telemetry signal from said one of three conductors in the ESP cable.

Each of embodiments A and B may have one or more of the following additional elements in any combination: (1) an isolation transformer that couples the motor power signal from a variable drive to the three conductors. (2) a sensor power source that provides the sensor power signal, wherein the HLV source coupler couples the sensor power signal to the internal node via a low pass filter. (3) a receiver that demodulates and digitizes the telemetry signal, wherein the HLV source coupler includes a bandpass filter that conveys the telemetry signal from the internal node to the receiver. (4) a transmitter that provides a downlink signal, wherein the bandpass filter conveys the downlink signal to the internal node. (5) wherein the bandpass filter is one of multiple bandpass filters, each coupling a discrete channel to the internal node. (6) wherein the bandpass filter is tunable to different frequency bands. (7) wherein the upper blocking frequency of the low frequency blocking filter is greater than a frequency of the motor power signal, wherein the low pass filter has a cutoff frequency above the upper blocking frequency of the low frequency blocking filter and below the frequencies passed by the bandpass filter. (8) an HLV sensor coupler that conveys the sensor power signal from a wye point of the motor to a power supply and that further conveys the telemetry signal from one or more sensors to the wye point. (9) wherein the HLV sensor coupler comprises: a shared internal node that is coupled to the wye point by a low frequency blocking filter that shields the shared internal node from the motor power signal; a low pass filter that conveys the sensor power signal from the shared internal node to the power supply; and a bandpass filter that conveys the telemetry signal from the one or more sensors to the shared internal node. (10) a switch that couples the HLV source coupler to the selected one of three conductors, the selected conductor being one of two cable conductors to which the switch is connected. (11) wherein said supplying includes: coupling the sensor power signal from a sensor power source via a low pass filter to an internal node; and coupling the sensor power signal from the internal node via a low frequency blocking filter to said one of three conductors, wherein the low frequency blocking filter shields the internal node from a motor power signal while passing the sensor power signal and the telemetry signal. (12) wherein said receiving includes: coupling the telemetry signal from the internal node via a bandpass filter to a receiver, wherein the bandpass filter shields the receiver from the sensor power signal. (13) wherein said conveying includes: coupling the sensor power signal from the wye point via a low frequency blocking filter to a shared internal node; and coupling the sensor power signal from the shared internal node via a low pass filter to a power supply for the downhole sensor assembly, wherein the low frequency blocking filter shields the internal node from the motor power signal while passing the sensor power signal and the telemetry signal. (14) wherein said providing includes: coupling the telemetry signal from a transmitter in the downhole sensor assembly via a downhole bandpass filter to the shared internal node, wherein the downhole bandpass filter shields the transmitter from the sensor power signal. (15) wherein said receiver is paired with a transmitter, and wherein said receiving further includes coupling a downlink signal from the transmitter via the bandpass filter to the internal node. (16) wherein said receiver is paired with a transmitter, and wherein said receiving further includes coupling a downlink signal from the transmitter via a second bandpass filter to the internal node. (17) changing the telemetry signal to a different frequency band that is passed by additional bandpass filters in the HLV source coupler and HLV sensor coupler. (18) switching the HLV source coupler to a different one of the three conductors in the ESP cable. (19) using an impedance matching transformed between the HLV sensor coupler and the sensor assembly to modify an apparent impedance of the HLV sensor coupler based on an impedance of the motor.

Numerous variations and modifications will become apparent to those skilled in the art once the above disclosure is fully appreciated. For example, the figures show ESP system configurations, but other downhole systems also employ three-phase power delivery cables which can similarly be adapted for robust data communications. It is intended that the following claims be interpreted to embrace all such variations and modifications.

What is claimed is:

1. An electrically powered artificial lift system that comprises:
   a tubular for conveying a wellbore fluid upward;
   a downhole pump that urges the wellbore fluid into the tubular, the downhole pump being driven by a three-phase motor;
   a cable that conveys a motor power signal to the motor on three conductors; and
   a high-to-low voltage (HLV) source coupler having an internal node coupled to a selected one of the three conductors via a low frequency blocking filter that shields the internal node from the motor power signal while conveying a sensor power signal from the internal node to the selected conductor and conveying a telemetry signal from the selected conductor and to the internal node.

2. The system of claim 1, further comprising:
   a sensor power source that provides the sensor power signal, wherein the HLV source coupler couples the sensor power signal to the internal node via a sensor power filter.

3. The system of claim 2, further comprising:
   a receiver that demodulates and digitizes the telemetry signal, wherein the HLV source coupler includes a bandpass filter that conveys the telemetry signal from the internal node to the receiver.

4. The system of claim 3, further comprising a transmitter that provides a downlink signal, wherein the bandpass filter conveys the downlink signal to the internal node.

5. The system of claim 3, wherein the bandpass filter is one of multiple bandpass filters, each coupling a discrete channel to the internal node.

6. The system of claim 3, wherein the bandpass filter is adjustable to different frequency bands.

7. The system of claim 3, wherein the low frequency blocking filter has an upper blocking frequency above a frequency of the motor power signal, wherein the sensor power filter has a cutoff frequency above the upper blocking frequency and below the frequencies passed by the bandpass filter.

8. The system of claim 3, further comprising:
   a HLV sensor coupler that conveys the sensor power signal from a wye point of the motor to a power supply and that further conveys the telemetry signal from one or more sensors to the wye point.

9. The system of claim 8, wherein the HLV sensor coupler still further conveys a downlink signal from the wye point to a sensor assembly operating from the power supply.

10. The system of claim 8, wherein the HLV sensor coupler comprises:
    a shared internal node that is coupled to the wye point by a low frequency blocking filter that shields the shared internal node from the motor power signal;

a filter that conveys the sensor power signal from the shared internal node to the power supply; and a bandpass filter that conveys the telemetry signal from the one or more sensors to the shared internal node.

11. The system of claim 1, further comprising a switch that couples the HLV source coupler to the selected one of three conductors, the selected conductor being one of two cable conductors to which the switch is connected.

12. A sensing method that comprises:

connecting an electric submersible pump (ESP) cable to a three-phase power source;

supplying, via an impedance-matched high-to-low voltage (HLV) source coupler, a sensor power signal to one of three conductors in the ESP cable;

conveying, with an impedance-matched HLV sensor coupler, the sensor power signal from a wye point in a motor for the pump to a downhole sensor assembly;

providing, with the HLV sensor coupler, a telemetry signal from the downhole sensor assembly to the wye point; and receiving, via the HLV source coupler, the telemetry signal from said one of three conductors in the ESP cable.

13. The method of claim 12, wherein said supplying includes:

coupling the sensor power signal from a sensor power source via a filter to an internal node; and coupling the sensor power signal from the internal node via a low frequency blocking filter to said one of three conductors, wherein the low frequency blocking filter shields the internal node from a motor power signal while passing the sensor power signal and the telemetry signal.

14. The method of claim 13, wherein said receiving includes:

coupling the telemetry signal from the internal node via a bandpass filter to a receiver, wherein the bandpass filter shields the receiver from the sensor power signal.

15. The method of claim 14, wherein said conveying includes:

coupling the sensor power signal from the wye point via a low frequency blocking filter to a shared internal node; and coupling the sensor power signal from the shared internal node via a filter to a power supply for the downhole sensor assembly, wherein the low frequency blocking filter shields the internal node from the motor power signal while passing the sensor power signal and the telemetry signal.

16. The method of claim 15, wherein said providing includes:

coupling the telemetry signal from a transmitter in the downhole sensor assembly via a downhole bandpass filter to the shared internal node, wherein the downhole bandpass filter shields the transmitter from the sensor power signal.

17. The method of claim 14, wherein said receiver is paired with a transmitter, and wherein said receiving further includes coupling a downlink signal from the transmitter via the bandpass filter to the internal node.

18. The method of claim 14, wherein said receiver is paired with a transmitter, and wherein said receiving further includes coupling a downlink signal from the transmitter via a second bandpass filter to the internal node.

19. The method of claim 14, further comprising changing the telemetry signal to a different frequency band that is passed by additional bandpass filters in the HLV source coupler and HLV sensor coupler.

20. The method of claim 12, further comprising switching the HLV source coupler to a different one of the three conductors in the ESP cable.

21. The method of claim 15, wherein said coupling the sensor power signal from the shared internal node via a filter to a power supply further includes using an impedance matching transformer between the filter and the power supply to modify an apparent impedance of the HLV sensor coupler based on an impedance of the motor.

* * * * *